May 23, 1933. J. W. SHERA 1,910,410
SEAL FOR BARRELS AND THE LIKE
Filed May 22, 1931
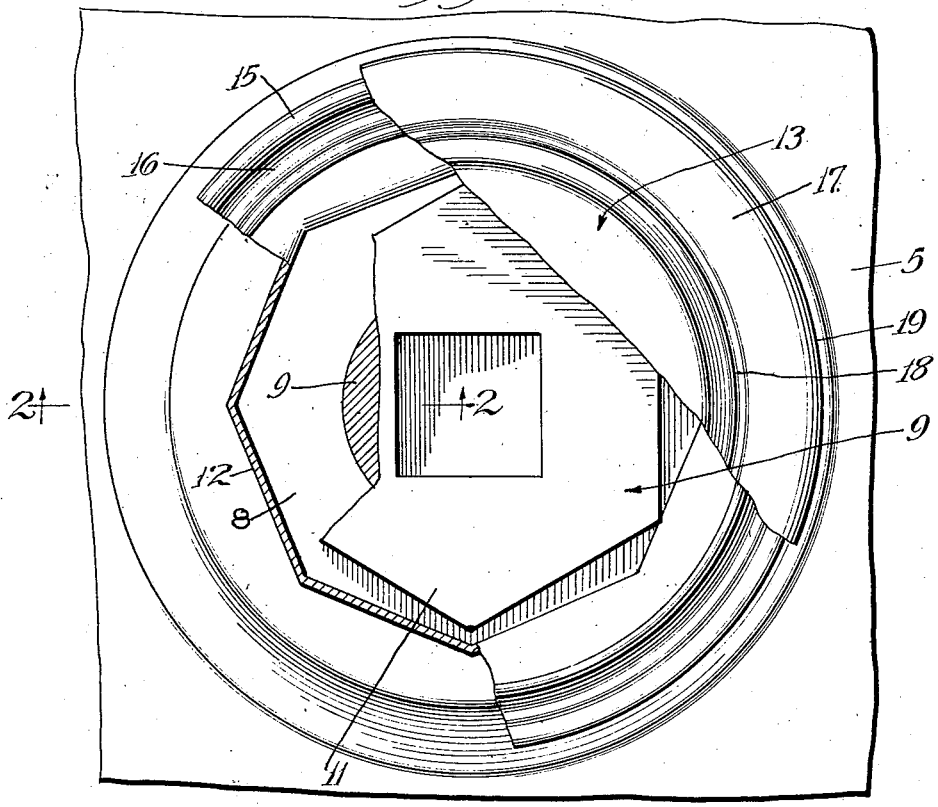
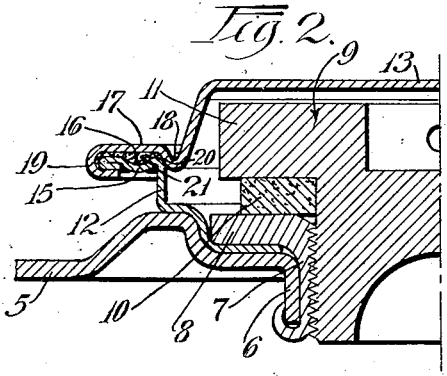
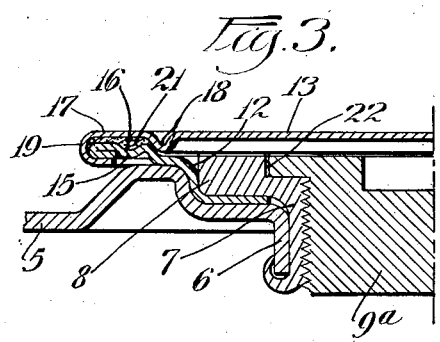
Inventor:
John W. Shera Patented May 23, 1933

1,910,410

UNITED STATES PATENT OFFICE

JOHN W. SHERA, OF CHICAGO, ILLINOIS, ASSIGNOR TO AMERICAN FLANGE & MANUFACTURING COMPANY, OF CHICAGO, ILLINOIS, A CORPORATION OF ILLINOIS

SEAL FOR BARRELS AND THE LIKE

Application filed May 22, 1931. Serial No. 539,200.

My invention relates to sealing devices for the plugs or bungs of steel barrels and the like in which oil or other liquids are shipped.

The principal object of my invention is to provide an improved seal which is leak-proof and prevents undetectable removal of the plug, while at the same time the seal is simple in structure, attractive in appearance and easily applied.

The attainment of the above and other objects will become apparent from the following description when taken in connection with the accompanying drawing in which:

Fig. 1 is a top plan view of the device showing the several parts broken away;

Fig. 2 is a cross sectional view taken on the line 2—2 of Fig. 1; and

Fig. 3 is a view corresponding to Fig. 2 and shows a modified form of the device.

Referring to Figs. 1 and 2, the wall 5 of the barrel or drum which is usually formed of sheet metal, such as steel, is provided with a rim 6 surrounding the opening in the barrel. A threaded bushing 7 fits in the rim 6 and has a flange 8 overlapping the portion of the barrel around the opening. A plug 9 having wrench receiving means, is adapted to be screwed into the bushing and a gasket 10 may be provided between the bushing flange 8 and a flange 11 on the plug.

The anti-leak sealing device includes a lower annulus or part 12 and a cap 13, which together cover the flange of the bushing and the top of the plug 9. The lower part 12 has its lower portion clamped firmly between the flange 8 and the wall of the barrel. The upper margin of the part 12 is bent to form a flange 15 with its outer edge turned back upon itself and with a groove 16 in its upper face. The cap 13 has its margin formed into a flange 17 having on one side a circular rib 18 and on the other side a downturned edge 19, to provide a channel fitting over the flange 15. A gasket 21 is provided between the flanges 15 and 17 and is preferably formed by coating the lower face of the flange 17 with a rubber compound.

After the barrel is filled with the oil or other liquid the plug is screwed in place. In shipping the plug may become loose or the gasket 10 may be affected by weather conditions with the result that the barrel leaks with attendant loss of part of the product and fire or explosion hazard unless sealed. The seal in addition to preventing unauthorized tampering with the plug or the refilling of the barrel with a spurious product without detection, acts as a hermetic seal to prevent loss and eliminate hazards due to any leakage past the plug. After the plug is screwed in place the cap 13 is positioned so that its channel fits over the flange 15 and then the bottom of its edge 19 is curled or crimped under the flange 15 by any suitable tool. The rib 18 snugly fits at 20 in the lower part to form a tight friction joint. The edge of the flange 15 is strengthened by turning the metal back upon itself to permit a firmer and tighter attachment of the edge 19 to the flange. The groove 16 in the flange accommodates the compression of the gasket 21 when the cap is applied. The rib 18 confines the gasket 21 by preventing some of it from being squeezed inwardly from between the flanges 15 and 17.

It will be apparent that if any liquid leaks past the plug it cannot escape as the sealing device hermetically seals the plug so that no liquid can be lost and fire and explosion hazards are eliminated. When access is once had to the plug after sealing, any tampering is readily detectable as the seal must be destroyed in order to reach the plug. Nor can the cap be replaced without detection, after the seal is once broken and hence fraudulent refilling with a spurious product and resealing is prevented.

In Fig. 3, I have illustrated a modified form of the invention. In this form the height of the sealing device is much reduced this being permitted by the different form of plug 9ª whose flange is seated in a recess 22 in the bushing. The plug may be formed of wood or some composition material. The use of such plug, which is more effected by temperature conditions and moisture than a metal plug is permitted with my invention because it is not so important to have a tight plug as any liquid which leaks past the plug cannot escape. The wood or composition plug offers some advantages over the metal plug as the former is very cheap and may be thrown away after one use.

Changes may be made without departing from the spirit of the invention.

I claim:

1. The combination with a container of the class described with a hole through the wall thereof, of a bushing associated with said hole, and a leak-proof sealing device including a lower annulus portion and a cap portion, the lower portion being associated with the bushing, and one of such portions having a flange at its edge and the other a channel in its margin with one side wall of the channel inclined and fitting snugly within the portion having the flange and the other side wall of the channel bent around the edge of said flange.

2. The combination with a container of the class described with a hole through the wall thereof, of a bushing associated with said hole, and a leak-proof sealing device comprising a lower annulus portion and a cap portion and a gasket, the lower portion being secured to the container by the bushing and having a flange at its upper edge with a groove in the flange and the cap portion having its margin superimposed over said flange and its edge bent around the edge of said flange, the gasket being positioned between said flange and the margin of the cap portion superimposed over said flange.

3. The combination with a container of the class described with a hole through the wall thereof, of a bushing associated with said hole, and a leak-proof sealing device comprising a lower annulus portion and a cap portion and a gasket, the lower portion being secured to the container by the bushing and having a flange at its upper edge with a groove in the flange and the edge of the flange bent back upon itself and the cap portion having a flange and an annular rib fitting snugly within the upper end of the lower portion and the edge of one portion being crimped around the edge of the other portion, the gasket being positioned between said flanges.

In testimony whereof, I have subscribed my name.

JOHN W. SHERA.